UNITED STATES PATENT OFFICE.

ROBERT JACQUELET, OF CATONSVILLE, MARYLAND.

METHOD OF MAKING HYDROGEN PEROXID.

1,364,558. Specification of Letters Patent. Patented Jan. 4, 1921.

No Drawing. Application filed November 19, 1919. Serial No. 339,222.

*To all whom it may concern:*

Be it known that I, ROBERT JACQUELET, French citizen, residing at Catonsville, Maryland, have invented certain new Methods of Making Hydrogen Peroxid, of which the following is a specification.

This invention relates to methods of making hydrogen peroxid; and it comprises a method of making strong hydrogen peroxid solutions containing a small amount of barium chlorid in solution wherein water acidified with hydrochloric acid is treated with barium dioxid and nitric acid, to form a solution containing hydrogen peroxid and a small amount of barium chlorid while forming a precipitate of barium nitrate; the hydrogen peroxid being afterward, if desired, extracted from the solution so formed; all as more fully hereinafter set forth and as claimed.

In the manufacture of hydrogen peroxid solutions for commercial purposes, it has long been the custom to react upon barium dioxid, $BaO_2$, with acids in the presence of water in various ways; thereby forming a barium salt and a solution of $H_2O_2$. Acids forming normally insoluble barium salts, such as phosphoric acid and sulfuric acid, are usually employed. As is known, nitric acid may be employed for this purpose, since barium nitrate is but sparingly soluble and particularly in the presence of any free nitric acid. In the formation of any of these insoluble or sparingly soluble barium salts however the difficulty is that the action is not far going; it is hard to secure any complete conversion of the barium dioxid in the presence of small amounts of water; that is, under circumstances which will give a tolerably strong solution of hydrogen peroxid.

In the present invention I avail myself of the fact that hydrochloric acid forms a somewhat more soluble barium salt and performs the conversion by nitric acid in the presence of a small amount of hydrochloric acid; usually about 2.5 per cent. HCl. On treating barium dioxid with weak hydrochloric acid a correspondingly small amount of hydrogen peroxid is formed and barium chlorid goes into solution. I have found that on now adding nitric acid, which may be the commercial strong acid of 40° Baumé (62 per cent. $HNO_3$), its action is mainly confined to the barium chlorid in the solution; barium nitrate being formed, and hydrochloric acid set free to attack more barium dioxid and go through the process again. The amount of the two acids employed together is about that equivalent to the amount of barium dioxid used. With proper operation there is no liberation of chlorin from the production of aqua regia; and all the barium dioxid is utilized. The final result is a solution of hydrogen peroxid which may be of such a strength as to be the equivalent of 35 or 40 volumes of oxygen, this solution containing a small amount of dissolved barium chlorid. The rest of the barium is found in the form of a crystalline nitrate which may be subsequently utilized in known ways to reproduce barium dioxid and nitric acid. The barium nitrate, washed, pressed and dried, is a clean white powder. It may be sold as such.

The hydrogen peroxid solution does not contain enough barium chlorid in solution to interfere with its use for many purposes. If the operation is properly conducted, it will be stable and neutral. This solution may be treated in the usual way to obtain stronger solutions or to get pure hydrogen peroxid. It may for example be concentrated *in vacuo*. An advantageous mode of operation in preparing strong material is to concentrate *in vacuo* and then extract the peroxid with ether ("sulfuric ether"); using one of the continuous extraction methods if desired. From the extract the ether may be recovered by distillation *in vacuo*. By systematic operation in this manner pure peroxid solutions of almost any desired strength may be obtained.

In a specific embodiment of my process, a water solution of hydrochloric acid containing about 2.5 per cent. by weight of HCl may be treated with sufficient powdered barium dioxid to saturate the acid; the mixture thus produced treated with enough nitric acid to be equivalent to the HCl; more barium dioxid added, and so on. In using nitric acid, in order to avoid dilution of the solution, it is best to use the strong commercial acid of about 40° Baumé. As stated, under the circumstances of this process, the nitric acid does not set free chlorin at the expense of the hydrochloric acid. In order to avoid the presence in the solution of impurities from the barium dioxid, it is a useful expedient during the operation to filter the mixture while slightly alkaline.

What I claim is:—

1. The process of manufacturing hydrogen peroxid solution which comprises treating barium dioxid with weak hydrochloric acid to form barium chlorid and hydrogen peroxid and precipitating barium nitrate from the solution with the aid of nitric acid, the relative proportions of barium dioxid, hydrochloric acid and nitric acid being so adjusted that the final liquid is a substantially neutral solution of hydrogen peroxid containing a little barium chlorid.

2. In the manufacture of hydrogen peroxid solutions, the process which comprises adding barium dioxid to a weak hydrochloric acid solution, adding nitric acid equivalent to the hydrochloric acid, adding barium dioxid, and so on, until a solution of the desired strength in hydrogen peroxid is produced, said solution containing dissolved barium chlorid in small amount.

In testimony whereof I have hereunto set my hand in the presence of two subscribing witnesses.

R. JACQUELET.